United States Patent

Shelby et al.

Patent Number: 6,159,406
Date of Patent: Dec. 12, 2000

[54] PROCESS FOR RAPID CRYSTALLIZATION OF POLYESTERS AND CO-POLYESTERS VIA IN-LINE DRAFTING AND FLOW-INDUCED CRYSTALLIZATION

[75] Inventors: Marcus David Shelby, Kingsport; Michael Eugene Donelson, Gray; Stephen Weinhold; Harry Probert Hall, both of Kingsport, all of Tenn.

[73] Assignee: Eastman Kodak Company, Kingsport, Tenn.

[21] Appl. No.: 09/577,082

[22] Filed: May 24, 2000

Related U.S. Application Data

[60] Provisional application No. 60/135,770, May 25, 1999.

[51] Int. Cl.$^7$ .................................................. B29C 47/88
[52] U.S. Cl. .................... 264/211.12; 528/302; 528/481; 528/502; 528/503; 264/176.1; 264/210.7
[58] Field of Search .................................... 528/302, 481, 528/502, 503; 264/176.1, 210.7, 211.12

[56] References Cited

U.S. PATENT DOCUMENTS

| 4,064,112 | 12/1977 | Rothe et al. |
| 5,292,865 | 3/1994 | Kerpes et al. |

FOREIGN PATENT DOCUMENTS

| 7223221 | 8/1995 | Japan |
| 8155952 | 6/1996 | Japan |
| WO 09/02479 | 1/1998 | WIPO |

OTHER PUBLICATIONS

"Extrusion of Film Tapes" in *Plastics Extrusion Technology*, Ed. by F. Hensen, Hanser, New York, 1988, p. 299.

*Primary Examiner*—Samuel A. Acquah
*Attorney, Agent, or Firm*—Karen A. Harding; Harry J. Gwinnell

[57] ABSTRACT

The present invention relates to a process for introducing strain-induced crystallization to polyesters. Specifically, amorphous polymer from the melt phase reactor is first extruded through a traditional strand die. However, instead of going directly into a pelletizer/cutter, it is stretched uniaxially at a temperature only slightly higher than Tg. The chain alignment resulting from stretching makes crystallization occur at a considerably higher rate than with traditional thermal crystallization. After this stretching process, the strand is annealed and fed to the pelletizer and chopped. The process of the present invention is advantageous for crystallizing polymers having slow rate of thermal crystallization half time from the glass. Optically clear polymers having at least about 15% crystallinity and a single melting point endotherm are produced.

19 Claims, 2 Drawing Sheets

PROCESS FOR RAPID CRYSTALLIZATION OF POLYESTERS AND CO-POLYESTERS VIA IN-LINE DRAFTING AND FLOW-INDUCED CRYSTALLIZATION

CROSS REFERENCE TO RELATED APPLICATIONS

This application claims the benefit of U.S. Provisional Application Ser. No. 60/135,770 filed May 25, 1999.

BACKGROUND OF THE INVENTION

It is usually preferable that polyester (or copolyester) pellets be produced and supplied to customers/processors in a crystalline form. This is because they can be dried at higher temperatures (without sticking together) and because they will feed better down the barrel of an extruder or injection molding machine. Furthermore, having crystalline pellets is advantageous from a manufacturing standpoint in that, optionally, they can be further polymerized (without melting) via a process known as "solid stating". Solid stating is more economical than "melt phase" polymerization and also has the additional benefit of removing undesirable volatiles like acetaldehyde.

Typical "melt phase" polyester reactors produce only amorphous pellets. To make these pellets crystalline, they are usually heated to elevated temperatures, while being constantly stirred/agitated in some manner in order to prevent sticking or clumping. This process, which we will refer to as "thermal crystallization" to distinguish it from the current invention, is usually performed in a "crystallizer". The crystallizer is nothing more that a heated vessel with a series of paddles or agitator blades to keep the pellets stirred (e.g. a Bepex solid stater). Alternately, a crystallizer can consist of a hot, fluidized bed for keeping the pellets apart (e.g. a Buhler solid stater). If the polyester or co-polyester crystallizes very slowly, then the latter type cannot be applied because the softened sticky pellets will eventually clump together and disrupt the fluidized bed before crystallization can occur.

A typical PET manufacturing process involves forming the polymer via melt phase polymerizing up to a certain IV or molecular weight, extruding and cutting the polymer strands into amorphous pellets, crystallizing, and then heating to an even higher temperature while under nitrogen purge (or vacuum) in order to continue to build molecular weight or IV (i.e. solid stating). Unfortunately, the solid stating process can not be applied directly to amorphous polyesters because they will flow and stick together. Thus, most hard-to-crystallize polyesters are not solid-stated.

The ability to rapidly crystallize amorphous pellets is not only beneficial for manufacture of the resins (via solid stating), but, as mentioned before, is also of benefit to the extruder/processor since it allows for higher drying temperatures. Polyesters are hydrolytically unstable and have to be thoroughly dried before extruding or molding to prevent IV degradation. Being able to dry at higher temperatures means better drying efficiency. Amorphous polyesters can only be dried at temperatures below the Tg of the polymer (typically 70 to 80° C.) because of the sticking/clumping problem. Crystalline versions of the same polyesters, however, can be dried at much higher temperatures (usually around 150 to 175° C.) and thus can be thoroughly dried in a much shorter time.

The traditional thermal crystallization methods (i.e. a standard "crystallizer") have a number of problems. First, the agitation required to keep the pellets from sticking can also cause chipping and other damage to the pellets; which can lead to dust generation or the presence of "fines" in the crystallizer. These small pieces of chipped off plastic can often cause extrusion problems if not properly filtered. Another serious problem is that thermal crystallization methods do not usually work well for co-polyesters. Co-polyesters crystallize at a much slower rate than homopolymers. Thus they may require excessively long residence times in a thermal crystallizer in order to achieve an acceptable level of crystallinity.

Thus there remains a need in the art for improved methods to crystallize polymers having high I.V., such as those which are solid stated.

JP 07223221 and JP 08155952 and involve the preparation of pellets by stretching solidified strands or sheet. The polyesters described have low melting points (170° C. or less) and glass transition temperatures up to 40° C. and are prone to aggregation during storage or drying.

U.S. Pat. No. 5,292,865, focuses primarily on the aftertreatment of polyester pellets to improve devolatilization of acetaldehyde and solid state polycondensation. U.S. Pat. No. 5,292,865 also discloses a process in which polyester strands can be cooled after exiting the reactor die, stretched at least 2× and then immediately chopped to form pellets. The stretch temperature is between Tg and 30° C. below the melting point. However, U.S. Pat. No. 5,292,865 does not disclose that the strain induced crystallization will be sufficient to impart crystallinity to otherwise amorphous or difficult to crystallize polyesters, or that those polyesters could then be solid stated without a thermal crystallization step.

WO 98/02479 discloses a compositions having 5–25 weight % isopthalic acid. The compositions are formed into article such as film, fibers and containers which are crystallized using both strain and thermal induced crystallization. WO 98/02479 does not disclose or suggest imparting strain induced crystallization prior to pelletization.

Processes for rapidly crystallizing a polymer strand by stretching/drafting are commonly used in the fiber and monofilament industry. However, the fiber/monofilament "melt to spin" processes produce final strands having significantly different final strand diameters and lengths as well as improved tensile and mechanical properties which remain with the strands through use because the strands are not re-melting.

SUMMARY OF THE INVENTION

The present invention involves the insertion of an axial drafting or stretching station in between the melt-phase reactor's strand die and the pelletizer. The drafting/stretching station is used to impart orientation and thus, strain-induced crystallinity, to the polyester, at a rate much faster than could occur using a traditional thermal crystallizer. This stretching makes it possible to crystallize some copolyesters which otherwise could not be thermally crystallized at an economical rate. This in turn, makes it possible to solid-state polymerize these copolyesters, and/or to dry them at higher temperatures prior to extrusion.

This invention further relates to a process comprising the steps of forming a molten strand or sheet of polymer, stretching said strand or sheet to induce up to about 40% crystallinity (less for copolymers), annealing said strand or sheet and pelletizing said strand or sheet.

Specifically, an embodiment of the present invention relates to forming a molten strand or sheet of polyester comprising a first discarboxylic acid component, a first glycol component and at least about 5 mole %, and in some embodiments at least about 10 mole % of at least one second dicarboxylic acid component, glycol component or mixture thereof; stretching said strand or sheet to induce at least about 15% crystallinity, preferably annealing said strand or sheet, and pelletizing said strand or sheet.

A second embodiment of the present invention relates to forming a molten strand or sheet of polyester having a rate of thermal crystallization half time from the glass of at least about 3 minutes at the temperature of fastest crystallization; stretching said strand or sheet to induce at least about 15% crystallinity, annealing said strand or sheet, and pelletizing said strand or sheet.

Yet another embodiment relates to forming a molten strand or sheet of polyester from melt polymerization; stretching said strand or sheet to induce at least about 15% crystallinity; preferably annealing said strand or sheet; pelletizing said strand or sheet to form solid polyester having a single endotherm; forming a shapes article from said solid polyester and heatsetting said shaped article.

The present invention further relates to polyester compositions having at least about 10 mole % copolymer modification, a single endotherm and small, uniform crystalline structure.

The process of the present invention is useful for copolyesters as well as blends.

DETAILED DESCRIPTION

The present invention relates to introducing strain-induced crystallization to polyesters and preferably to polyesters, such as highly modified copolyesters and blends, which are otherwise very difficult to thermally crystallize. In the process of the present invention, the amorphous polymer from the melt phase reactor is first extruded through a traditional strand die. However, instead of going directly into a pelletizer/cutter, it is stretched uniaxially at a temperature only slightly higher than Tg. The chain alignment resulting from stretching makes crystallization occur at a considerably higher rate than with traditional thermal crystallization. After this stretching process, the strand is preferably annealed and then taken to the pelletizer and chopped. Annealing is a process where the strand is partially restrained while being heated to a higher temperature. This allows the oriented chains to relax somewhat while further increasing the amount of crystallinity.

Since this strain-induced crystallization process is in-line with the existing reactor and imparts crystallinity almost instantaneously (even with copolyesters), it can be implemented inexpensively. Further, it provides the opportunity to crystallize, and thus solid state, copolyesters that otherwise would not be thermally crystallizable. This is beneficial in both resin manufacturing (since it enables the use of solid stating for previously difficult to crystallize materials) and extruding, which can now employ higher drying temperatures.

Figure 1:
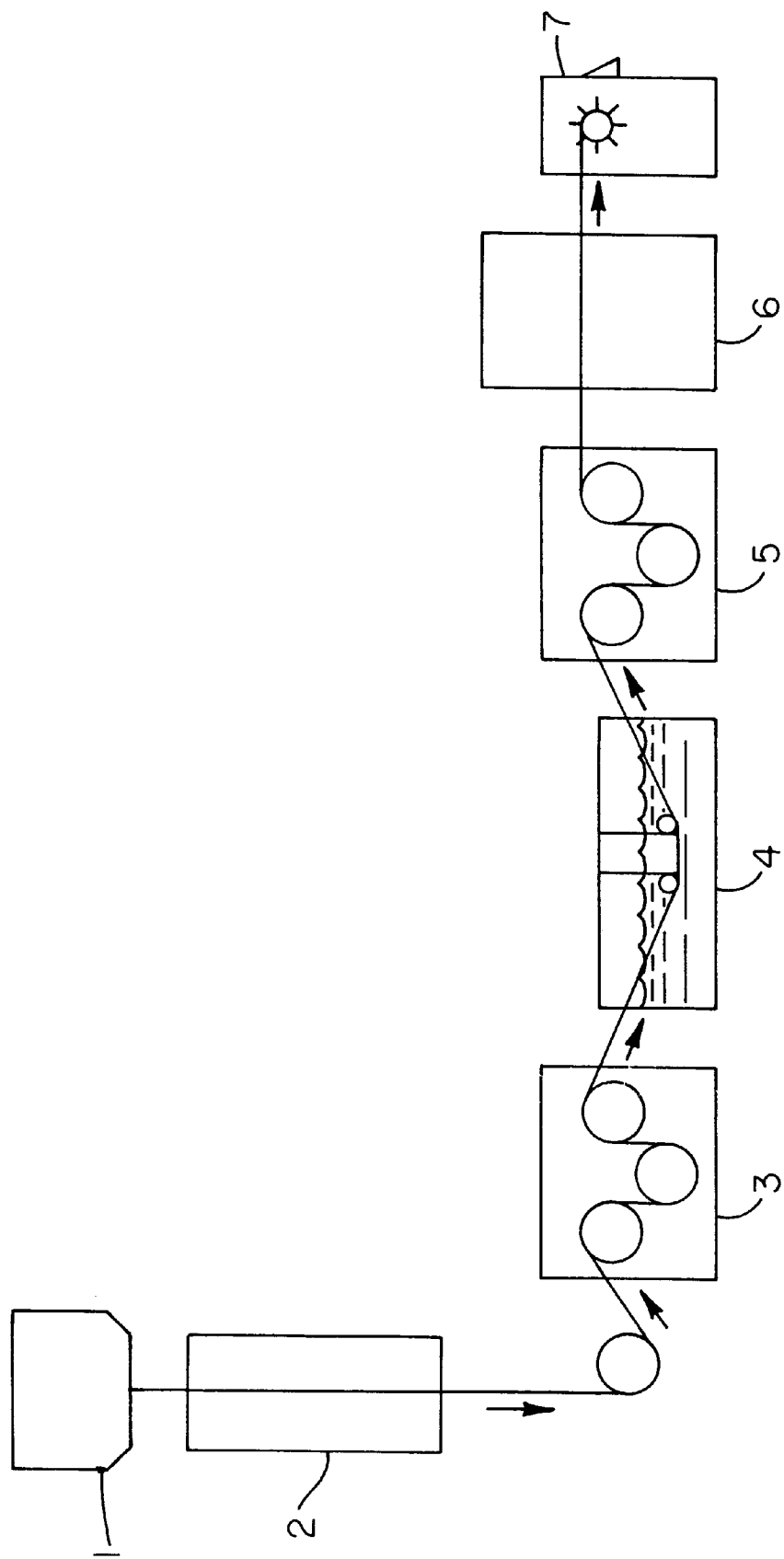
FIG. 1 is an illustration of a stretching station for a PET strand.

The present invention involves inserting an axial drafting or stretching station in between the melt-phase reactor's strand die and the pelletizer (see FIG. 1). The drafting/stretching station is used to continuously impart orientation and thus, strain-induced crystallinity, to the polyester strands, at a rate much faster than could occur using a traditional thermal crystallizer. This stretching makes it possible to crystallize copolyesters and/or blends which otherwise could not be thermally crystallized at an economical rate. This in turn, makes it possible to solid-state polymerize these co-polyesters and/or blends, and/or to dry them at higher temperatures prior to extrusion.

FIG. 1 is an illustration of a stretching station for a PET strand. The polyester leaves the melt phase reactor from the strand die, 1 where it is rapidly cooled below its glass transition temperature, Tg, by any suitable means, such as a spray cabinet, 2. Next, it is conveyed through a series of godet rolls, 3 and into a hot water bath or hot air oven, 4 set at a temperature above about Tg. Stretching occurs because the second set of godet rolls, 5 is traveling at a higher rate than the first. Next, the strand can be (optionally) conveyed through the heatset oven 6, and then formed into the desired form such as pellets, in the pelletizer, 7.

Step one of the invention is to extrude the amorphous polyester directly from the melt phase reactor, using a strand die. This can involve a single filament, or as is more traditionally done, multiple filaments (with multiple filaments, it is beneficial to guide them in a parallel, non-touching fashion, through the rolls and water bath using standard strand separating devices). It is also possible to extrude the polyester using a standard single or twin screw extruder as was done in the examples. This might be beneficial for crystallizing scrap and regrind from a film or bottle manufacturing plant. Scrap normally has to be crystallized using a more traditional thermal crystallizer before it can be dried and reprocessed but the present invention (using an extruder instead of a melt reactor) would provide a more efficient crystallization method.

After extrusion, these filaments are then rapidly cooled using a water bath, a water spray cabinet, or air. A water spray cabinet is a preferred method for many high molecular weight polyesters, as they are commonly used in existing polymer lines. However, this may not be preferred for all polyester lines. The hole diameter of the strand die must be adjusted for drawdown so that the final oriented strands will produce pellets of the desired size after pelletization. Drawdown will occur both within the water spray cabinet (although little orientation will occur because the polymer is so hot) and in the drafting stage. Neglecting die swell, the die diameter D(die) can be related to the desired pellet diameter D(pellet) by $$\frac{D(die)}{D(pellet)} = \lambda_{tot}^{1/2} \quad (1)$$

where $\lambda_{tot}$ is the total axial stretch ratio (i.e both the stretching in the drafting station and during melt spinning inside the spray cabinet).

The next step is to thermally condition the strands to the appropriate temperature for stretching and strain-induced crystallization to occur. Maximum crystallization rates during stretching usually occur between Tg+about 10° C. to Tg+about 40° C. although this depends on the actual stretching rate (Tg for PET homopolymer is approximately 80° C. resulting in a stretch temperature window of from about 90° to 120° C.). As the rate of stretching is decreased, the optimum stretch temperature actually decreases. This combined effect of temperature and stretching rate is related to the degree of chain relaxation for the given polymer. Strain-induced crystallization relies on chain orientation, which, in turn is a function of the relative mobility of the chains, and the chain entanglements. As the temperature is increased, chain mobility also increases making it harder to keep the chains aligned (due to chain slippage and rearrangement). Thus it is preferably to stretch near Tg (and why stretching at very high temperatures results in almost no measurable orientation). In a similar manner, very slow stretching rates allow more time for the chains to relax before sufficient orientation can occur for crystallization. Thus, stretch rates faster than the rate at which molecular relaxation can occur are preferred. Suitable stretching (strain) rates include those between about $0.01\ s^{-1}$ and about $1000\ s^{-1}$ for temperatures from about Tg up to about 30° C. below the melting point (Tm-30° C.) (with higher strain rates required at higher temperatures). A more preferred set of stretch conditions consists of a strain rate between $0.1\ s^{-1}$ and $100\ s^{-1}$ at a stretch temperature between about Tg+10° C. and about Tg+50° C. However, it will be appreciated that the required stretch ratio to achieve strain hardening and crystallization will vary with the stretch conditions which are selected. In one embodiment of the present desirable stretch conditions were typically between about 4 to about 6× elongation at about Tg+20° C. (i.e. 90° C.).

Thermal conditioning can be achieved using a water bath, infrared lamps, hot air oven, mixtures thereof and the like. For polyesters where the stretch temperature is below the boiling point of water, water baths can be quite effective. The method depicted in FIG. 1 utilizes a water bath placed between two sets of drafting or "godet" rolls. The strands are wrapped through the first set of godet rolls, passed through the water bath, and then through the second set of godet rolls. The godet rolls help to provide a good, non-slip contact with the strands so that tensioning and stretching can be properly applied. Stretching actually occurs inside the hot water bath because the second set of godet rolls is traveling faster than the first. The ratio of the velocities of the two sets of rolls determines the actual drafting stretch ratio. For polyesters, this stretch ratio can be from 1 (no stretching) to 10 or more, with the preferred stretch ratios being between about 3 and 7 (the stretch ratio is equal to the stretched strand length over the original length. It can be calculated for a given stretching station, as the ratio of the takeup roll velocity to the feed roll velocity. It can also be calculated for a circular strand as the square of the initial strand diameter divided by the final strand diameter $(D_1^2/D_2^2)$). Nevertheless, the optimal stretch ratio required for crystallization for a given polyester depends on the stretch temperature. Obviously a low stretch ratio (e.g. one) may result in no strain-induced crystallization, but this may be useful for applications where crystallinity is not desired (and one wants to bypass the stretching process). In other words the existing "unoriented" line could still be used without first having to remove the drafting system. In most cases it is desirable to achieve the maximum obtainable crystallinity using the minimum stretch ratio so that the die hole in the strand die does not have to be made excessively large. This means stretching at temperatures very close to Tg, usually about Tg+10 to about Tg+30° C. for the preferred stretch rates.

After stretching/drafting takes place, the oriented strands can optionally be annealed. Annealed in its simplest form involves restraining the strand while simultaneously annealing it at a hotter temperature, about 120° to about 210° C., and preferably between about 150° C. and about 190° C. For "non-traditional" copolyesters or polyesters with lower Tg's, the preferred annealing temperature is usually about half-way between the polyester's Tg and melt temperature since this is where the annealing rate is high and thermal crystallization is a maximum. Annealing times range from at least about 0.1 seconds to between about 0.1 second and about 30 seconds, and preferably between about 0.1 seconds and about 10 seconds. It should be appreciated that the hotter the temperature and the better the heat transfer the shorter the time required for annealing. Suitable annealing apparatus is known in the art and includes steam chests, hot air ovens, IR heating and the like. The equipment and conditions used in this annealing step are the same as those used for annealing film, sheet fiber and finished articles, such as containers, all of which are known in the art. Restraining the sample prevents it from shrinking, while at the same time allowing the amorphous orientation to relax (this prevents the pellets from shrinking during subsequent reheating and also prevents "shattering" during pelletization). Annealing also allows for the formation of additional thermal crystallization around the already present strain-induced crystals, thus increasing the total crystallinity content. Annealing can be performed on the strand using conventional fiber monofilament heatsetting equipment.

Annealing the strands prior to pelletization provides a highly beneficial processing improvement. We were surprised to find that highly oriented strands fed directly to a pelletizer shattered into glass-like shards when hit with the pelletizer blade. However when the pellets were annealed before cutting no shattering was observed. Even though annealing of the strands prior to pelletization is not required to provide strain induced crystallization, it is highly desirable to provide uniform, commercially desirable pellets.

Besides the fact that stretching induces crystallinity, it is also noted that stretching also changes the overall morphology of the pellet. For example, the strain-induced crystals tend to be much smaller than the traditional spherulitic crystals obtained by thermal crystallization. The latter tend to get large enough that they scatter visible light, making the thermally crystallized pellet look opaque. The strain-induced crystals, in contrast, are smaller than the wavelength of light and thus do not scatter light. Thus, the strain crystallized pellets of the present invention remain optically clear even at high crystallinity levels. This clarity remains even after solid stating thermal treatments.

The differences in crystallization morphology also affect the melting behavior. The strain-induced crystals tend to be much more uniform and thus melt over a narrower temperature range. Thermal crystals, in contrast, often exhibit multiple melting temperatures (or at least broader melting points) due do differences in crystal "stability" and structure. These melting points show up on a DSC as two separate melting endotherms separated by anywhere from a few degrees Celsius to about 30 or 40° C. These multiple melting points can usually only be eliminated by solid stating for the appropriate amount of time. As the sample is annealed at high temperatures (but below the melting points), the two peaks begin to merge into a single melting endotherm. This annealing is making the crystals more uniform in nature so that they all melt at roughly the same temperature. It is usually the goal of a solid stating process to increase molecular weight or IV to the appropriate target, and to simultaneously achieve enough annealing time so that the melting doublet is converted to a single melting endotherm. This often means that the rate of IV buildup has to be retarded (by changing solid stating temperatures, gas flows, etc) so that the appropriate amount of annealing can be performed without overshooting the IV target. If the doublet is not removed, it is possible that the non-uniform melting in the extruder (or injection molding machine) will result in poor feeding, incomplete melting, and/or bubbles in injection molding parts so proper annealing is critical from a quality control standpoint. By going to a strain-induced crystallization method, the double endotherm is already eliminated so long annealing times are not necessary. This means that the solid stater can be optimized to produce the highest IV buildup rate possible without having to worry about also maintaining long annealing times. This elimination of the double-endotherm is another important benefit of the present invention that has not been recognized in the prior art.

As mentioned previously, many copolymers systems are thermally crystallized, but not solid stated. So, these multiple melting points will still be present even up to the extruder, unless very long drying times are used prior to extrusion (which will usually cause yellowing of the polymer). By going to a strain-induced crystallization method, only a single narrow melting endotherm is produced so the polymer behaves in an extruder as if it has already been through solid stating (even though it has not). And, as mentioned before, having a narrower, single melting endotherm will make the polymer process more uniformly in the extruder and reduce surging.

An alternative process for producing oriented, crystalline pellets involves the fibrillation of extruded film as opposed to extruding individual and stretching strands. Fibrillation is often performed commercially with polyolefin tapes/film to create high stiffness fibers. It takes advantage of a polymer film's tendency to split along the stretch or machine direction upon drafting.

Figure 2:
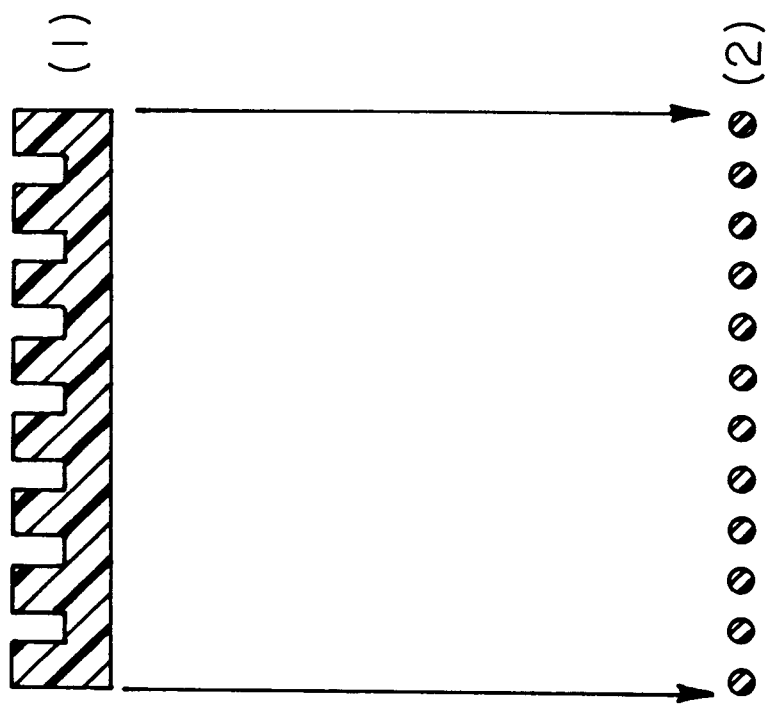
FIG. 2 depicts cross-sections during fibrillation.

FIG. 2 depicts cross-sections during fibrillation. (1) represents the castellated surface which occurs either after extrusion for the Barfilex process or after embossing for the roll embossing process. (2) represents the final strands after drafting and fibrillation is complete. Note that for the roll-embossing process the initial film is flat/smooth and does not obtain the castellated shape until after embossing. For the Barfilex process the film is extruded into the castellated shape.

Unlike the fiber/strand process described previously, fibrillation in the present invention requires that a film be extruded from the melt reactor (instead of multiple strands/rods). A key aspect of fibrillation is that a corrugated or castellated surface must be created in the film prior to the drafting step. This surface cross section is depicted in FIG. 2. It is possible to directly impart this castellated surface in the film die through a type of profile extrusion (referred to as the Barfilex process, which is disclosed in "Extrusion of Film Tapes" in *Plastics Extrusion Technology*, Ed. By F. Hensen, Hanser, New York, 1988, p 299, which is incorporated herein by reference). In other words, the film die itself has the castellated surface cut into it. Suitable variations, obvious to those skilled in the art, such as extruding the multiple fiber strands very close together so that they stick together, and the like, are also included in the present invention. This profiled film is then drawn down between the reactor die and a casting roll, which helps to initiate the splitting in the thin parts of the film. A separate cooling step is no longer needed as the casting roll now serves to cool the polymer down. Note this drawdown does not impart the strain-induced crystallization since the stretching temperature is too hot. Crystallization occurs in the next step where the film is passed through a true drafting station where it is stretched further at temperatures near Tg as with the strand process. This completes the splitting and helps to create fairly round, highly oriented and crystalline strands. Strain-induced crystallization is essentially the same as for the strand process. Whereas most commercial fibrillator operations are for the purpose of producing high strength fibers, for the current invention these strands would instead be passed to a pelletizer.

A second variation of the fibrillation process that can be applied to the present invention is known as the "roll embossing" process. It involves first extruding a flat film through the melt reactor die, onto a casting or chill roll. This film is then past through a set of embossing rolls to impart the castellated surface. After embossing, the film is then drafted as before to orient, crystallize and split the fibers, and is then pelletized. In both of these processes, the stretch ratios in the drafting step would be similar to the stretch ratios used for the strand method. However, it might be more advantageous to use a film drafting station (instead of godet rolls and a hot water bath) to impart the orientation. Film drafters are very similar to the fiber/strand operation except that stretching occurs only over a distance of a few inches to prevent "neck-in" of the film. In addition, heating of the film is usually performed via contact with the hot rolls as opposed to passing through a hot water bath.

In some embodiments film fibrillation may be preferred over the fiber strand method because line breakages are less of a problem. It is also much easier to handle, thread, and align a film web as opposed to multiple strands. However, it may be advantageous to use the fiber strand method in existing polymer lines to minimize the amount of refitting necessary. Fibrillation may also have advantages, at least for film producers, in that it provides an easy method to process and crystallize at least some of the scrap or "regrind" material that is often produced. It also provides a means for easily incorporating coextrusion so that a multiple layer "pellet" can be formed consisting of a second material (e.g. regrind, additive, color concentrate, etc.) sandwiched between the other two. This is not so easy to due with conventional strand dies.

By proper design of the embossing rolls, one might also take advantage of the embossing method to increase the amount of crystallinity. This is because high hydrostatic pressures can be generated in the nip of the rolls, and high pressures are known to enhance the rate of crystallization in polymers. By proper design of the rolls and the gap, it may be possible to literally "squeeze" in crystallinity into the film prior to drafting. This crystallinity would also help the splitting/fibrillation process downstream.

Another perturbation of the fibrillation process is to use a "pseudo-film" consisting of multiple strands/filaments that are stuck together. The multiple strands would be extruded out of the reactor strand die, but instead of keeping them separate, they would be brought together so that they stick. This film, composed of multiple, adhered strands, could then be past through the drafting/fibrillation process, whereby upon stretching, the strands would separate prior to pelletization. This collection of strands would preferably be flat (like a film) so that it could be processed on conventional film equipment. However, it is also possible to bring all of the strands together so that they stick in a tow or "rope" configuration. This "super-strand" would separate into the individual strands upon stretching. Pelletization of the sheet or film may be conducted by fibrillation of the sheet during stretching or, other means such as grinding.

It is particularly surprising that the present invention provides quick and convenient strain induced crystallization to polyesters having high copolymer modification, such as above about 5 and even above 10 mole %. In certain embodiments copolymers having between about 5 and 20 mole % copolymer modification are preferred. It was also surprising to find that polymers having slow thermal crystallization rates could be rapidly crystallized by the method of the present invention. Crystallization rate is measured using crystallization half times from the glass at the temperature of maximum crystallization rate (which depends on the polymer). A slow crystallization rate, as used herein is one from at least about 3 minutes, and from between about 3 minutes to up to about 30 minutes at the temperature at which crystallization occurs fastest for each given polyester. Typically polyesters having at least about 10 mole % and more particularly 15 mole % of a comonomer dibasic acid or glycol display crystallization rates in this range. Comonomer modification above about 20% frequently yields copolyesters which are or are considered amorphous because they cannot be thermally crystallized. Surprisingly, these highly modified, previously slowly crystallizing polyesters, can, in accordance with the present invention be readily crystallized and solid stated.

Suitable polyesters comprise a first dicarboxylic acid component and a glycol component wherein at least one of said acid and glycol components comprise at least about 10 mole % of at least one comonomer. It should be appreciated that copolyesters may be formed by adding comonomers to the polymerization reactor and also by forming polyester blends from virgin polyester, polyester scrap, post consumer recycled polyester and the like and mixtures thereof. The polyesters of the present invention have Tg greater than 40° C. and preferably greater than about 50° C.

The dicarboxylic acid component comprises are terephthalic, isophthalic, naphthalenedicarboxylic, 1,4-cyclohexanedicarboxylic acid, phenylenedioxydiacetic acid, mixtures thereof and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. The various isomers of phenylenedioxydiacetic acid or mixtures of isomers may be used but the 1,2-, 1,3-, 1,4-isomers are preferred. In addition to the acid forms, the lower alkyl esters or acid chlorides may be also be used.

The dicarboxylic acid component of the polyester may optionally be modified with up to about 25 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 7 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, mixtures thereof and the like.

Typical glycols useful as the glycol component in the polyester include aliphatic glycols containing from two to about ten carbon atoms, and cycloaliphatic glycols containing 7 to 14 carbon atoms. Preferred glycols include ethylene glycol, 1,4-butanediol, 1,6-hexanediol, 1,4-cyclohexanedimethanol, diethylene glycol, neopentyl glycol and the like. The glycol component may optionally be modified with up to about 50 mole percent, preferably up to about 30 mole % and most preferably between about 10 mole % and about 30 mole % of one or more different diols. Such additional diols include cycloaliphatic diols preferably having 6 to 20 carbon atoms, aromatic diols containing from 6 to 15 carbon atoms or aliphatic diols preferably having 3 to 20 carbon atoms. Examples of such diols include: diethylene glycol, triethylene glycol, 1,4-cyclohexanedimethanol (when using 1,4-cyclohexanedimethanol, it may be the cis, trans or cis/trans mixtures), propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 1,3-bis(2-hydroxyethoxy)benzene, 1,4-bis(2-hydroxyethoxy)benzene, 2,2-bis-(4-hydroxypropoxyphenyl)-propane, resorcinol, hydroquinone and the like. Preferred additional diols include diethylene glycol, 1,4-cyclohexane diol and mixtures thereof.

Difunctional components such as hydroxybenzoic acid may also be used.

Also small amounts of multifunctional polyols such as trimethylolpropane, pentaerythritol, glycerol and the like may be used if desired.

The resin may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Also, although not required, additives normally used in polyesters may be used if desired. Such additives include, but are not limited to colorants, pigments, carbon black, glass fibers, fillers, impact modifiers, antioxidants, stabilizers, flame retardants, reheat aids, acetaldehyde reducing compounds, barrier enhancing compounds, oxygen scavenging compounds, UV absorbing compounds and the like.

Prior to the polycondensation of the melt-phase process, a mixture of polyester monomer (diglycol esters of dicarboxylic acids) and oligomers are produced by conventional, well-known processes. One such process is the esterification of one or more dicarboxylic acids with one or more glycols; in another process, one or more dialkyl esters of dicarboxylic acids undergo transesterification with one or more glycols in the presence of a catalyst such as a salt of manganese, zinc, cobalt, titanium, calcium, magnesium or lithium. In either case, the monomer and oligomer mixture is typically produced continuously in a series of one or more reactors operating at elevated temperature and pressures at one atmosphere or greater. Alternately, the monomer and oligomer mixture could be produced in one or more batch reactors. Suitable conditions for esterification and transesterification include temperatures between about 200° to about 250° C. and pressures of about 0 to about 80 psig. It should be understood that generally the lower the reaction temperature, the longer the reaction will have to be conducted.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas not causing unwanted reaction. Suitable gases include, but are not limited to partially or fully dehumidified air, $CO_2$, argon, helium and nitrogen. Catalysts for the polycondensation reaction include salts of antimony, germanium, tin, lead, or gallium, preferably antimony or germanium. Reactions conditions for polycondensation include a temperature less than about 290° C., and preferably between about 240° C. and 290° C. at a pressure sufficient to aid in removing undesirable reaction products such as ethylene glycol. Precursor IhV is generally below about 0.7 to maintain good color. The target IhV is generally selected to balance good color and minimize the amount of solid stating required. Inherent viscosity (IhV) was measured at 25° C. using 0.50 grams of polymer per 100 ml of a solvent consisting of 60% by weight phenol and 40% by weight tetrachloroethane. The low molecular weight precursor polymer is typically produced continuously in a series of one or more reactors operating at elevated temperature and pressures less than one atmosphere. Alternately low molecular weight precursor polymer could be produced in one or more batch reactors.

Polymers having high copolymer modification may also be made by blending different polymers or polymer concentrates together. Blend components include, but are not limited to virgin polyester, polyester scrap, recycled polyester and copolyesters and polyester concentrates. The blend components may be added to the virgin polymer in a number of ways including admixing with virgin pelletized polyester, admixed with molten polyester from the polymerization reactor and the like. The blends are then extruded and crystallized as described above.

Optionally, the strain crystallized precursor may undergo further polycondensation in the solid state by conventional, well-known processes, such as those disclosed in U.S. Pat. No. 4,064,112. Solid state polycondensation can be conducted in the presence of an inert gas as defined above, or under vacuum conditions, and in a batch or continuous process. The polyester can be in the form of pellets, granules, chips or powder. Temperature during the solid state polycondensation process should be about 1 to about 60° C. below the melting point of the polyester as measured by differential scanning calorimetry (DSC).

In yet another embodiment of the present invention a strand crystallization line may be used to rapidly crystallize scrap polymer, including but not limited to edge trim, floor sweepings, and rejected articles, before adding the scrap back into the molding process. By installing a stretching station next to the main extruder, the molten scrap/polymer blend can be stretch crystallized and fed directly to the dryer(s). The strain induced crystallization of the present invention supplants the need for a thermal crystallizer. This embodiment may also be highly beneficial in the production of multilayer materials where one or more of the layers does not crystallize easily.

The polyester compositions of the present invention can and formed into a variety of shaped articles including film, sheet, preforms, containers, profiles, tubes, pipes and other packaging material by a melt molding method which is generally used in molding polyethylene terephthalate. Several polyester compositions of the present invention, such as those having comomoners selected from isophthalic acid, naphthalene dicarboxylic acid, phenylenedioxydiacetic acid, mixtures thereof and the like are usable as materials having a high gas barrier property in an unstretched state. Stretching the polyester composition at least uniaxially, further improves the gas barrier property and the mechanical strength.

A stretched sheet of a polyester composition of the present invention is produced by stretching a polyester of the present invention which has been formed into a sheet by injection molding or extrusion molding. The stretching method adopted may be freely selected from uniaxially stretching, sequential biaxially stretching and simultaneous biaxially stretching. It is also possible to form a stretched sheet of a polyester composition of the present invention into a cup or a tray by air-pressure forming.

Stretch blow molded containers made from the polyester of the present invention may be produced by either the one step extrusion blow molding method or the two step reheat blow mold method. The stretching temperature is about 70° to about 120° C., preferably about 80° to about 110° C., and the stretching ratio is about 1.5 to about 3.5 times in the machine direction and about 2 to about 5 times in the hoop direction.

If desired, the stretched bottles may be used as is or heatset in a mold at a temperature of not lower than about 100° C. The finish of the preform of the heatset bottles may be thermally crystallized before stretch blow molding or the finish may be thermally crystallized after stretch blow molding.

The polyester of the present invention may make up one or more layers of a multilayer that includes one or more barrier layers such as a polyamide, EVOH or a layer containing an oxygen scavenger.

It is also possible to form a uniaxially or biaxially stretched film from a polyester of the present invention or a can-shaped container, a tray or the like by vacuum forming or air-pressure forming after it is formed into a sheet by injection molding. It is also possible to form a polyester of the present invention into a multi-layered sheet of the polyester and polyethylene terephthalate, for example, by a multi-layer extruder and thereafter form the sheet into a uniaxially or biaxially stretched film, a can-shaped container or a tray.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Stretching Experiments on Copolymer PET 15086

PET 15086 is a copolymer containing 12% CHDM that is very difficult to thermally crystallize. It is often sold in an amorphous form. Amorphous pellets of PET 15086 were first extruded into multiple strands using a conventional single screw extruder and a strand die. The strands, having a nominal diameter of 100 mils, were extruded from the die and then quenched in a water bath. Because the extruder and drafting system for the initial trials were not in the same location, the strand was wound onto a drum. Next, this drum was transported to the drafting system and fed into the drafter. The drafter was a standard tow line drafter. The strands were unwound into the first set of godet rolls, into the water bath (set at 93° C.), through the final set of godet rolls, and into the pelletizer. One sample was also passed through a heatsetting oven set at 170° C. prior to pelletization although the residence time was very short (about 10 seconds). The first set of godet rolls was set at 3 meters/minute with the second set anywhere from 9 to 21 m/min. The ratio of roll speeds sets a drawdown ratio of from 3 to 7. Higher line speeds could have been easily obtained, although due to limited material, the speeds were kept low to preserve material.

The oriented pellets were optically clear with final diameters ranging from 30 to 40 mils. The percent crystallinity, as measured by DSC, was between 16 and 27% depending on the stretch ratio. For unoriented control pellets crystallized for 2 hrs. at 170° C., the crystallinity was determined to be 22% and, as expected, these unoriented pellets were opaque. It was determined that a minimum stretch ratio of about 3 was required in order to induce crystallization at the given stretch temperature. Stretch ratios above about 5 did not seem to increase the crystallinity any further.

The melting endotherm, for the oriented pellets occurred at about 224° C., and exhibited one single, narrow peak. The unoriented control pellet crystallized for 2 hrs. at 170° C. exhibited two melting endotherms: a smaller one at 183° C. and a larger one at 223° C. Typically to achieve a single endotherm with thermally crystallized pellets requires very long annealing times in order for the thermal crystals to "stabilize".

Crystallinity as measured by density gradient column for the oriented samples was lower (although the unoriented control remained at 22%). Values ranged from 3 to 15% which is lower than that measured by DSC. It is suspected that the difference in morphology in the oriented systems contributed to the discrepancy in the measurement techniques.

Shrinkage measurements were performed on oriented filaments (strands removed prior to pelletization) by placing the samples in a hot air oven for 5 minutes at 120° C. The shrinkage recovery for all of the samples was 20 to 22%.

Samples of the oriented pellets were placed in an oven at 190° C. under vacuum, for 24 hrs. to see how solid-stating conditions might affect the clarity. Interestingly, the oriented pellets remained optically clear. This indicates a very stable crystalline morphology consisting of very small oriented crystals.

EXAMPLE 2

Stretching Experiments on Homopolymer PET 9921

PET 9921 (IhV=0.76 dl/g ) was stretched under identical conditions to that described in Example 1. As with the PET 15086, the orientation caused a significant increase in crystallinity. Percent crystallinity from DSC varied from 20 to 32% whereas crystallinity from density measurements varied from 8 to 15%. A standard PET 9921 pellet (already crystallized and solid-stated), exhibited a crystallinity of about 45% (both DSC and density method). The melting temperature for the oriented strands was about 243° C. whereas for standard solid-stated PET 9921 pellets it was 239° C.

Percent shrinkage recovery for the PET strands was around 15%. However, the heatset strand had a negligible shrinkage of 2.5%. The heatset strand also appeared to be slightly higher in crystallinity than a non-heatset strand stretched in an identical fashion (DSC crystallinities of 31.5% vs. 25.7% respectively).

As with the PET15086 example, the stretched PET 9921 pellets were optically clear, and remained so, even after high temperature annealing.

EXAMPLE 3

Demonstration of Strand Fibrillation

The strands used in Example 1 and 2 usually consisted of doublets (i.e. two strands that were stuck together after leaving the strand die) rather than individual strands. These strands were effectively melt fused into a single strand, but had a weak weld line running between them that would be consistent with, for example, a groove from a fibrillation embossing roll. The bond between the strands was also strong as it was difficult to separate the strands by hand. Upon stretching, however these doublets readily separated and became two distinct strands (and thus distinct pellets). This process was serendipidously discovered as it was found that the single larger strand was much easier to handle and thread through the line than two separate strands. The separate strands would often get tangled and/or one would lose tension and fall of the roll. It was anticipated (although not desired) that this single large fused strand would result in a single large fused pellet so we were pleasantly surprised to find that that the doublet consistently separated through fibrillation. With a larger extruder and die, this process could have easily been expanded to consist of more than two fused strands (e.g. a pseudo-sheet).

COMPARATIVE EXAMPLES 1 AND 2

Two copolyesters were stretched using the process described in Example 1 and 2. The first was a copolyester modified with 37 mole % diethylene glycol (sold by Eastman Chemical Company under the trademark EASTABOND), and the second was a copolyester modified with 18 mole % of isophthalic acid. All of the strands were stretched between 5.5× and 6× with a water bath temperature of 85° to 90° C. prior to pelletization (except for the EASTABOND which had a bath temperature of 65° C. due to its low Tg of 55° C. Upon entering the pelletizer, however, these highly stretched strands "shattered", resulting in very flaky pellets that were almost "shard-like" in consistency. This flaking of the pellets was along the stretch direction and was essentially a form of microcracking or fibrillation parallel to the oriented chains. This flaking would be unacceptable in a commercial product as it resulted in a very dusty, non-uniform, low bulk density material that would neither solid-state uniformly or feed properly through an extruder. Crystallinities of the as stretched samples were approximately 3% and 20% for the first and second samples respectively as measured by DSC (density methods could not be used to the microfracture of the pellets).

EXAMPLES 4 AND 5

The copolymers used in Comparative Examples 1 and 2 were stretched using the same conditions as in Comparative Examples 1 and 2 except that an annealing step was added prior to pelletization. Annealing was performed via a steam chest in-line with the strand stretching operation. The steam chest had a temperature of 120° C. as measured by an IR pyrometer although the actual temperature in the chest may have been higher. This chest is typically used for heatset type of treatments for traditional fiber spinning operations. Residence time in the steam chest was 2 to 3 seconds and tension was reduced in the strands to prevent further stretching at these higher temperatures. The annealed strands were fed into the pelletizer which produced high quality, shard-free pellets. Crystallinities of the stretched and annealed samples were 10 and 25% for the first and second samples respectively as measured by DSC. This is significantly higher than the non-annealed samples which is an additional benefit provided by the annealing step.

We claim:
1. A process comprising the steps of
   forming a molten strand or sheet of polyester comprising a first dicarboxylic acid component, a first glycol component;

stretching said strand or sheet to induce at least about 15% crystallinity;

annealing said strand or sheet and pelletizing said strand or sheet.

2. The process of claim 1 wherein said polyester comprises at least about 5 mole % of at least one second dicarboxylic acid component, glycol component or mixture thereof.

3. The process of claim 1 wherein said polyester comprises at least about 10 mole % of at least one second dicarboxylic acid component, glycol component or mixture thereof.

4. The process of claim 1 wherein said molten strand or sheet of polyester has a rate of thermal crystallization half time from the glass of at least about 3 minutes at a temperature of fastest crystallization.

5. The process of claim 1 wherein said polyester formed from pelletizing has a single endotherm and said process further comprises forming a shapes article from said solid polyester and heatsetting said shaped article.

6. The process of claim 1 wherein said strands have a diameter of at least about 50 mils prior to said stretching step.

7. The process of claims 1 wherein said strands have a diameter between about 100 and about 300 mils prior to said stretching step.

8. The process of claim 1 wherein said annealing is conducted at a temperature between about 120° C. and about 210° C.

9. The process of claim 1 wherein said annealing is conducted at a temperature between about 150° C. and about 190° C.

10. The process of claim 1 wherein said annealing is conducted at a temperature of 170° C.

11. The process of claim 1 wherein said annealing is conducted for at least about 0.1 seconds.

12. The process of claim 1 wherein said annealing is conducted for a time between about 0.1 seconds and about 30 seconds.

13. The process of claim 1 wherein said pellets are optically clear.

14. The process of claim 1 wherein said pellets have a percent crystallinity, as measured by DSC, between about 15 and about 30%.

15. The process of claim 1 wherein said stretching is conducted at a stretch ratio of at least about 3.

16. The process of claim 1 wherein said stretching is conducted at a stretch ratio between about 3 and about 6.

17. The process of claim 4 wherein said rate of thermal crystallization half time from the glass is between about 3 minutes and about 30 minutes.

18. The process of claim 1 wherein said polyester comprises a blend of at least two blend components.

19. The process of claim 18 wherein said blend components are selected from the group consisting of virgin polyester, polyester scrap, recycled polyester and copolyesters and polyester concentrates.

* * * * *